United States Patent [19]

Nethe et al.

[11] Patent Number: 4,560,588

[45] Date of Patent: Dec. 24, 1985

[54] METHOD OF CONSOLIDATING SAND

[75] Inventors: Hans W. Nethe, Amsterdam, Netherlands; Frank R. Nethe, Rehovot, Israel

[73] Assignee: Degussa Aktiengesellschaft, Frankfurt, Fed. Rep. of Germany

[21] Appl. No.: 642,286

[22] Filed: Aug. 20, 1984

[30] Foreign Application Priority Data

Aug. 19, 1983 [DE] Fed. Rep. of Germany ....... 3329913

[51] Int. Cl.$^4$ ..................... C05F 11/08; A01B 79/00; A01C 1/00; B05D 7/00
[52] U.S. Cl. ........................................ 427/215; 47/58; 71/62; 71/63; 106/287.34; 106/900; 405/263; 428/404
[58] Field of Search ................ 427/215; 428/403, 404; 106/287.17, 287.34, 900; 71/62, 63; 47/58; 405/263

[56] References Cited

U.S. PATENT DOCUMENTS 3,640,696 2/1972 Goldmann .......................... 71/62 X
3,642,509 2/1972 Fujimasu ......................... 106/900 X Primary Examiner—Michael R. Lusignan
Attorney, Agent, or Firm—Beveridge, DeGrandi & Weilacher

[57] ABSTRACT

Sandy soils, e.g., loess-containing desert soils, are treated with an aqueous dispersion of pyrogenically produced silicon dioxide and/or corresponding mixed oxides of silicon to achieve consolidation of the sand.

14 Claims, No Drawings

METHOD OF CONSOLIDATING SAND

This invention relates to a method of consolidating and stabilizing sand consisting essentially of impregnating sand with an aqueous dispersion of pyrogenically produced silicon dioxide and/or corresponding mixed oxides of silicon, to thereby enable better retention of plant roots in the sand.

The subject matter of the invention is a method of consolidating sand or sandy soils, which is carried out by treating sand or sandy soil with an aqueous dispersion of pyrogenically produced silicon oxide and/or corresponding mixed oxides of silicon.

The aqueous dispersion applied according to the teachings of the invention can have a concentration ranging from 0.1 to 25, preferably 0.5 to 2.5 percent by weight silicon oxide and/or mixed oxides.

Aqueous dispersions of the pyrogenically produced silicon dioxide and/or aluminum mixed oxide of silicon that can be applied with advantageous results in accordance with the principles of the invention are known in the art and are described in a brochure entitled "Schriftenreihe Pigmente No. 33" published by Degussa AG, Frankfurt, Germany in July, 1982, which is relied on herein.

In a preferred embodiment of the invention, an aqueous dispersion can be applied which contains a pyrogenically produced mixed oxide from aluminum oxide and silicon oxide. For example, the aluminum oxide content of the mixed oxide is up to 1.3 percent by weight. In this case, the aqueous dispersion contains 150 g/1 1,000 cm$^3$ silicon dioxide. The viscosity at 20° C. is 1.1 to 1.4° E. The pH value is 5–6 and the specific weight 1.8 g/cm$^3$ (at 20° C).

This dispersion is commercially available under the abbreviated designation AEROSIL-K 315 ( Degussa AG). Alternatively, AEROSIL MOX 170 may also be used. Generally, the aluminum oxide content of the mixed oxides ranges from 0.3 to 1.3% weight, although up to 10% aluminum oxide may be used.

The lower limit of the effective amount of aluminum oxide can vary depending on conditions. The mixed oxide compositions may be produced by a confumed process as in known in the art.

By way of example, a boron/silicon mixed oxide can also be employed as a pyrogenically produced mixed oxide of silicon. It can be identified by the following specifications:

| | |
|---|---|
| BET surface | 180 m$^2$/g |
| B$_2$O$_3$ content | 3.5 percent by weight in relation to the dried substance |
| Ignition loss | <5% |
| Drying Loss | 1.5% at 105° C. |
| pH value | 3 to 3.8 (with 4% suspension of the oxide in water) |

The boron oxide content ranges from 0.1 to 10% by weight on the same basis as above.

According to the invention, the sand can be mixed or sprayed with the aqueous dispersion. In the case of relatively large surfaces in particular, the sand is preferably sprayed with the aqueous dispersion.

The silicon oxide containing dispersions as described function to obtain a determined agglomeration of finely divided components of the soil. As a result of that property, a solidification of the soil takes place which stabilizes the soil against flooding and wind erosion. Additional effects obtainable thereby are a resistance to silting as the agglomerated soil performs as a drainage system and, especially in desert soils, enables a better retention of plant roots.

Fumed silicas (such as aerosils, pyrogenic silica) are produced by vapor phase processes, generally by the vapor phase hydrolysis of silicon tetrahalides. Other methods include vaporization of SiO$_2$, vaporization and oxidation of silicon, and high temperature oxidation and hydrolysis of silicon compounds such as silicate esters. Production of mixed oxides (Al$_2$O$_3$ and silica, boron oxide and silica) may be accomplished analogously through confumed processes. These are techniques well known in the art. See Kirk-Othmer, Encyclopedia of Chemical Technology, 3rd Edition, p. 763 et seq. relied on and incorporated herein by reference.

A surprising finding was that with the method taught by the invention, it is possible to consolidate sandy soils without further admixtures and without the use of high temperatures, regardless of the sand content of natural soils. As an example, desert soils may contain only a few percent loess, but also up to 60% non-arenaceous aggregate. A surprising fact is that highly concentrated aqueous dispersions of pyrogenically produced silicic acids or their mixed oxides are not required for the consolidation of sandy soils. Merely a single impregnation of sand with 1 or 5% aqueous AEROSIL silicon aluminum mixed oxide dispersion (K315) is sufficient to accomplish consolidation. The natural soil erosion by rain and wind in conjunction with temperature conditions can be significantly reduced by the method incorporating the invention.

The following example demonstrates the consolidation: 200 g dry desert sand is placed in a Petri dish and sprayed with a single does of 10 ml of a 5% AEROSIL-K315 solution without moving or intermixing. The Petri dish is allowed to stand 24 hours at ambient temperature, during which time the water evaporates. When the body of sand consolidated in this fashion is immersed in water, the original shape is preserved for several minutes in the water before it starts to disintegrate. A standard sample of the same sand which was sprayed with tap water only, instead of with the AEROSIL dispersion disintegrated immediately after immersion in water.

It is also possible to utilize the invention to form retaining banks or mounds, as in a drainage system, so that the rain will soak into the sandy soil and not be washed away.

Further variations and modifications of the invention will be apparent to those skilled in the art from the foregoing and are intended to be encompassed by the appended claims.

The priority application No. P 33 29 913.7 of Aug. 19, 1983 is relied on and incorporated herein.

We claim:

1. A method of consolidating and stabilizing sand, consisting essentially of impregnating sand with an aqueous dispersion of pyrogenically produced silicon dioxide and/or corresponding mixed oxides of silicon, to thereby enable better retention of plant roots in the sand.

2. The method of claim 1, further comprising said aqueous dispersion containing 0.1 to 25% by weight concentration of oxide.

3. The method of claim 1, further comprising said aqueous dispersion containing 0.5 to 2.5% by weight concentration of oxide.

4. The method of claim 1, further comprising said dispersion comprising a mixture of silicon dioxide and aluminum oxide.

5. The method of claim 4, further comprising the amount of aluminum oxide being present in an amount up to about 10% of the oxide content.

6. The method of claim 5, further comprising the amount of aluminum oxide being 0.3 to 1.3%.

7. The method of claim 1, further comprising said dispersion comprising a mixture of silicon dioxide and boron oxide.

8. The method of claim 7, further comprising said boron oxide being present in an amount from 0.1 to 10% by weight of the oxide content.

9. The method of claim 1, further comprising impregnating shaped mounds of sand to prevent flooding and wind erosion.

10. The method of claim 1, further comprising utilizing an aqueous dispersion of boron/silicon mixed oxide having the following properties:

| BET surface | 180 m$^2$/g |
| --- | --- |
| B$_2$O$_3$ content | 3.5 percent by weight in relation to the dried substance |
| Ignition loss | <5% |
| Drying loss | 1.5% at 105° C. |
| pH value | 3 to 3.8 (with 4% suspension of the oxide in water). |

11. The method of claim 1, further comprising shaping the sand into mounds and thereafter impregnating.

12. The method of claim 1, further comprising mixing said dispersion with sand and shaping the sand into a desired form.

13. The method of claim 1, further comprising impregnating the sand at ambient temperature.

14. The method of claim 1, further comprising utilizing an aqueous dispersion of silicon oxide and 1.3% by weight aluminum oxide, said dispersion containing 150 g/1,000 cm$^3$ silicon dioxide, having a viscosity of 1.1 to 1.4° E. at 20° C., a pH of 5 to 6 and a specific weight of 1.8 g/cm$^3$ at 20° C.

* * * * *